United States Patent
Hussein et al.

(10) Patent No.: US 12,333,811 B2
(45) Date of Patent: Jun. 17, 2025

(54) PERMUTATION INVARIANT CONVOLUTION (PIC) FOR RECOGNIZING LONG-RANGE ACTIVITIES, GENERATING GLOBAL REPRESENTATION OF INPUT STREAMS AND CLASSIFYING ACTIVITY BASED ON GLOBAL REPRESENTATION

(71) Applicant: QUALCOMM Technologies, Inc., San Diego, CA (US)

(72) Inventors: Noureldien Mahmoud Elsayed Hussein, Amsterdam (NL); Efstratios Gavves, Amsterdam (NL); Arnold Wilhelmus Maria Smeulders, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/769,246

(22) PCT Filed: Nov. 13, 2020

(86) PCT No.: PCT/US2020/060595
§ 371 (c)(1),
(2) Date: Apr. 14, 2022

(87) PCT Pub. No.: WO2021/097359
PCT Pub. Date: May 20, 2021

(65) Prior Publication Data
US 2024/0135708 A1    Apr. 25, 2024

(30) Foreign Application Priority Data

Nov. 15, 2019 (GR) ............................. 20190100517

(51) Int. Cl.
*G06V 20/40* (2022.01)
*G06V 10/82* (2022.01)
(Continued)

(52) U.S. Cl.
CPC .............. *G06V 20/46* (2022.01); *G06V 10/82* (2022.01); *G06V 20/41* (2022.01); *G06V 20/49* (2022.01);
(Continued)

(58) Field of Classification Search
None
See application file for complete search history.

(56) References Cited

U.S. PATENT DOCUMENTS 12,087,043 B2 *   9/2024  Mittal .................... G06V 10/82
2019/0108399 A1   4/2019  Escorcia et al.
(Continued)

FOREIGN PATENT DOCUMENTS

| CN | 109389055 A | 2/2019 |
| CN | 109753884 A | 5/2019 |
| CN | 109961005 A | 7/2019 |

OTHER PUBLICATIONS

Non Patent Literature (NPL) published to AJ Piergiovanni et. al., on Jun. 18, 2018 in IEEE/CVF Conference on Computer Vision and Pattern Recognition Workshop.*

(Continued)

*Primary Examiner* — Haris Sabah
(74) *Attorney, Agent, or Firm* — QUALCOMM Incorporated

(57) ABSTRACT

A method for recognizing long-range activities in videos includes segmenting an input video stream to generate multiple frame sets. For each of the frame sets, a frame with a highest likelihood of including one or more actions of a set of predefined actions is identified regardless of its order in the frame set. A global representation of the input stream is generated based on pooled representations of the identified frames. A long-range activity in the video stream is classified based on the global representation.

30 Claims, 9 Drawing Sheets

(51) Int. Cl.
G06V 20/58 (2022.01)
G06V 30/19 (2022.01)

(52) U.S. Cl.
CPC ............ G06V 20/582 (2022.01); G06V 20/44 (2022.01); G06V 30/19173 (2022.01)

(56) References Cited

U.S. PATENT DOCUMENTS

2020/0160061 A1* 5/2020 Deng .................. G06T 7/246
2024/0094807 A1* 3/2024 Zhang ................ G06F 3/013

OTHER PUBLICATIONS

Hussein N., et al., "PIC: Permutation Invariant Convolution for Recognizing Long-Range Activities", arxiv.org. Cornell University Library, 201 Olin Library Cornell University Ithaca, NY 14853, Mar. 18, 2020 (Mar. 18, 2020), XP081624114, 10 Pages, the whole document.

International Search Report and Written Opinion—PCT/US2020/060595—ISA/EPO—Apr. 14, 2021.

Limin W., et al., "Latent Hierarchical Model of Temporal Structure for Complex Activity Classification", IEEE Transactions on Image Processing, IEEE Service Center, Piscataway, NJ, US, vol. 23. No. 2, Feb. 1, 2014 (Feb. 1, 2014). pp. 810-822, XP011536813, 28 Pages, ISSN: 1057-7149, DOI:10.1109/TIP.2013.2295753 [retrieved on Jan. 8, 2014] abstract, figure 1 section I Introduction.

Ng J.Y-H., et al., "Beyond Short Snippets: Deep Networks for Video Classification", 2015 IEEE Conference on Computer Vision and Pattern Recognition (CVPR), IEEE, Jun. 7, 2015 (Jun. 7, 2015), pp. 4694-4702, XP032793927, DOI: 10.1109/CVPR.2015.7299101 [retrieved on Oct. 14, 2015] Abstract; figures 1, 2 Section 3.1 "Feature Pooling Architectures".

Piergiovanni AJ., et al., "Fine-Grained Activity Recognition in Baseball Videos", 2018 IEEE/CVF Conference on Computer Vision and Pattern Recognition Workshops (CVPRW), IEEE, Jun. 18, 2018 (Jun. 18, 2018), pp. 1821-18218, XP033475529, pp. 1853-1861, DOI: 10.1109/CVPRW.2018.00226 [retrieved on Dec. 13, 2018] Abstract, Figure 5 Sect ion 4 "Segmented Video Recognition Approach".

Wang K., et al., "3D Human Activity Recognition with Reconfigurable Convolutional Neural Networks", Multimedia, ACM. 2 Penn Plaza, Suite 701 New York NY 10121-0701 USA, Nov. 3, 2014 (Nov. 3, 2014), pp. 97-106, XP058058677, 11 Pages, DOI: 10.1145/2647868.2654912 ISBN: 978-1-4503-3063-3 abstract, figure 2.

Limin W., et al., "Latent Hierarchical Model of Temporal Structure for Complex Activity Classification", IEEE Transactions on Image Processing, IEEE Service Center, Piscataway, NJ, US, vol. 23. No. 2, Jan. 7, 2015, 28 Pages.

Ng J.Y-H., et al., "Beyond Short Snippets: Deep Networks for Video Classification", 2015 IEEE Conference on Computer Vision and Pattern Recognition (CVPR), IEEE, Jun. 7, 2015, pp. 4694-4702.

Piergiovanni AJ., et al., "Fine-Grained Activity Recognition in Baseball Videos", 2018 IEEE/CVF Conference on Computer Vision and Pattern Recognition Workshops (CVPRW), IEEE, Jun. 18, 2018, pp. 1853-1861.

Wang K., et al., "3D Human Activity Recognition with Reconfigurable Convolutional Neural Networks", Multimedia, ACM. 2 Penn Plaza, Suite 701 New York NY 10121-0701 USA, Nov. 3, 2014, 11 Pages.

* cited by examiner

… (1)

PERMUTATION INVARIANT CONVOLUTION (PIC) FOR RECOGNIZING LONG-RANGE ACTIVITIES, GENERATING GLOBAL REPRESENTATION OF INPUT STREAMS AND CLASSIFYING ACTIVITY BASED ON GLOBAL REPRESENTATION

CROSS-REFERENCE TO RELATED APPLICATION

The present application is a national stage entry under 35 U.S.C. 371 of PCT/US2020/060595, filed on Nov. 13, 2020, and titled "PERMUTATION INVARIANT CONVOLUTION (PIC) FOR RECOGNIZING LONG-RANGE ACTIVITIES," which claims priority to Greece Patent Application No. 20190100517, filed on Nov. 15, 2019, and titled "PERMUTATION INVARIANT CONVOLUTION (PIC) FOR RECOGNIZING LONG-RANGE ACTIVITIES," the disclosures of which are expressly incorporated by reference in their entireties.

FIELD OF DISCLOSURE

Aspects of the present disclosure generally relate to temporal modeling and, more particularly, to modeling the temporal structure of long-range activities in videos.

BACKGROUND

An artificial neural network, which may comprise an interconnected group of artificial neurons (e.g., neuron models), may refer to a computational device or a method to be performed by a computational device. The artificial neural network may be used for various applications and/or devices, such as Internet Protocol (IP) cameras, Internet of Things (IoT) devices, autonomous vehicles, and/or service robots.

Conventional neural networks use various operations, such as convolution, self-attention, or vector aggregation, to classify short-range actions. However, these operations do not scale up to the requirements of long-range activities. It is desirable to improve neural networks to recognize long-range activities.

SUMMARY

In an aspect of the present disclosure, a method for recognizing long-range activities is provided. The method includes segmenting an input stream to generate multiple frame sets. The method also includes identifying, for each frame set from the multiple frame sets, a frame with a highest likelihood of including a selected action. Additionally, the method includes generating a global representation of the input stream from pooled representations of the identified frames. Further, the method includes classifying a long-range activity based on the global representation.

In another aspect of the present disclosure, an apparatus for recognizing long-range activities is provided. The apparatus includes a memory and one or more processors coupled to the memory. The processor(s) are configured to segment an input stream to generate a plurality of frame sets. The processor(s) are also configured to identify, for each frame set from the multiple frame sets, a frame with a highest likelihood of including one or more actions of a set of predefined actions. In addition, the processor(s) are configured to generate a global representation of the input stream based on pooled representations of the identified frames. The processor(s) are further configured to classify a long-range activity based on the global representation.

In another aspect of the present disclosure, an apparatus for recognizing long-range activities is provided. The apparatus includes means for segmenting an input stream to generate multiple frame sets. The apparatus also includes means for identifying, for each frame set from the multiple frame sets, a frame with a highest likelihood of including one or more actions of a set of predefined actions. Additionally, the apparatus includes means for generating a global representation of the input stream from pooled representations of the identified frames. Further, the apparatus includes means for classifying a long-range activity based on the global representation.

In a further aspect of the present disclosure, a non-transitory computer readable medium is provided. The computer readable medium has encoded thereon program code for recognizing long-range activities. The program code is executed by a processor and includes code to segment an input stream to generate a plurality of frame sets. The program code also includes code to identify, for each frame set from the multiple frame sets, a frame with a highest likelihood of including one or more actions of a set of predefined actions. Furthermore, the program code includes code to generate a global representation of the input stream from pooled representations of the identified frames. Further, the program code includes code to classify a long-range activity based on the global representation.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
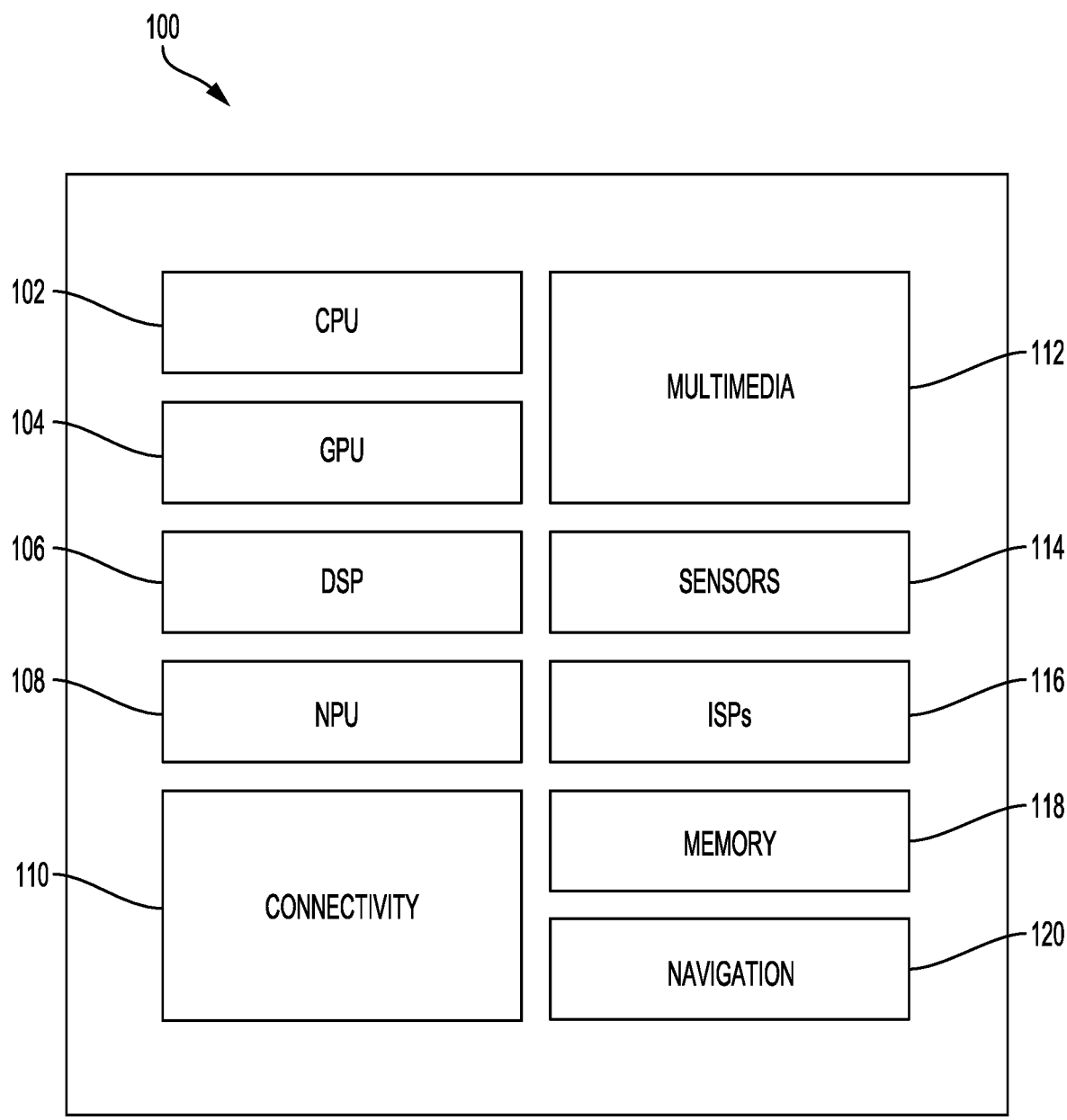
FIG. 1 illustrates an example implementation of designing a neural network using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described is "exemplary" is not necessarily to be construed as preferred or advantageous over other aspects.

Although particular aspects are described many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In most cases, conventional action recognition systems use convolutions, self-attention, or vector aggregation to classify an action depicted in an input stream (e.g., a video). These conventional action recognition systems may accurately identify actions from an input stream with a time span that is less than a threshold. These actions may be referred to as short-range actions. For example, conventional action recognition systems may accurately identify short-range actions such as skiing, boxing, and fencing.

In some conventional action recognition systems, temporal modeling employs temporal convolution. The temporal modeling relies on a learned kernel $W=\{w_i | i \in [1, \ldots, T]\}$, $W \in \mathbb{R}^{T \times C}$, where T, C are the kernel size and dimension, respectively. At the i-th timestep, the input feature in a local window $X_w = \{x_i | i \in [1, \ldots, T]\}$ is convolved ($\circledast$) with the kernel W, the output feature is $y \in \mathbb{R}^{1 \times 1}$. The temporal convolution for such conventional action recognition systems is formulated as:

$$y = W \otimes X_w = \sum_{i=1}^{T} w_i \odot x_i^T \qquad (1)$$

With this convolution operation, the kernel W may learn to detect an exact temporal order of the sequence $X_w$. However, this convolution operation is sensitive to the precise sequential order of $X_w$. Accordingly, conventional action recognition systems are not permissive to the many temporal configurations a sequence of unit-actions can take place in a long-range activity. In other words, accuracy of conventional action recognition systems is reduced when the time span of the input stream is greater than a threshold. These actions may be referred to as long-range activities. Long-range activities may include, for example, cooking a meal or making coffee. Long-range activities can last for three minutes, five minutes, ten minutes or even longer. In some cases, long-range activities last for less than three minutes. Additionally, in some aspects, long-range activities may be characterized as being diverse in composition, and chaotic (meaning difficult to predict) in temporal order.

Aspects of the present disclosure are directed to modeling the temporal structure of long-range activities in videos. In one configuration, the temporal structure is modeled by a layer of a neural network. For simplicity, the layer will be referred to as a permutation invariant convolution (PIC) layer.

In contrast to conventional vector aggregation systems, aspects of the present disclosure learn long-range temporal abstractions using cascading layers. In contrast to conventional convolutions systems, aspects of the present disclosure provide a receptive field that is invariant to temporal permutations of features, such that weak temporal structures may be modeled. Finally, in contrast to conventional self-attention systems, aspects of the present disclosure use shared weights to improve the detection of discriminant visual evidence across long videos as well as noisy videos. Accordingly, in comparison to conventional action identification systems, accuracy of long-range activity recognition is improved by incorporating the PIC layer(s) in a neural network.

FIG. 1 illustrates an example implementation of a system-on-a-chip (SOC) 100, which may include a central processing unit (CPU) 102 or a multi-core CPU configured for long-range modeling in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from the memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to segment an input stream to generate multiple frame sets. The general-purpose processor 102 may also comprise code to identify, for each frame set from the multiple frame sets, a frame with a highest likelihood of including a selected action. The general-purpose processor 102 may further comprise code to generate a global representation of the input stream from pooled representations of the identified frames. The general-purpose processor 102 may also comprise code to classify a long-range activity from the global representation.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
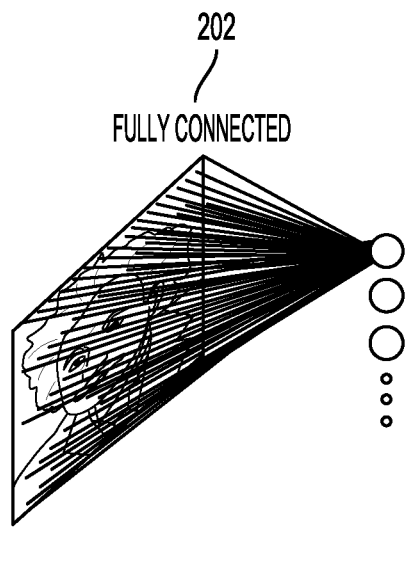
FIGS. 2A, 2B, and 2C are diagrams illustrating a neural network, in accordance with aspects of the present disclosure.
Figure 2B:
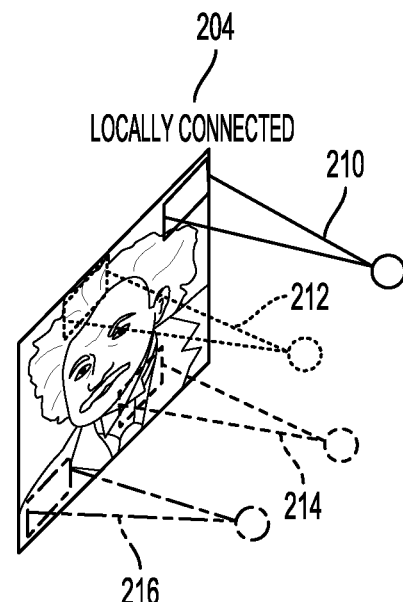

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
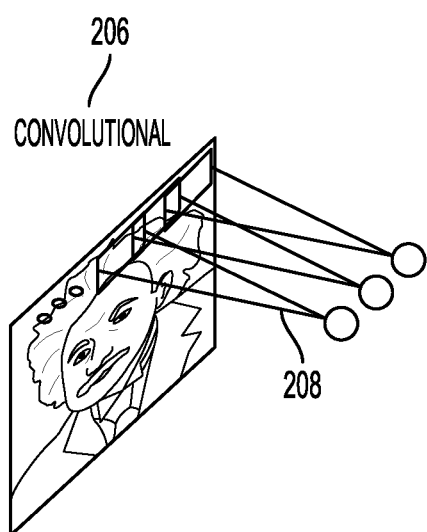

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
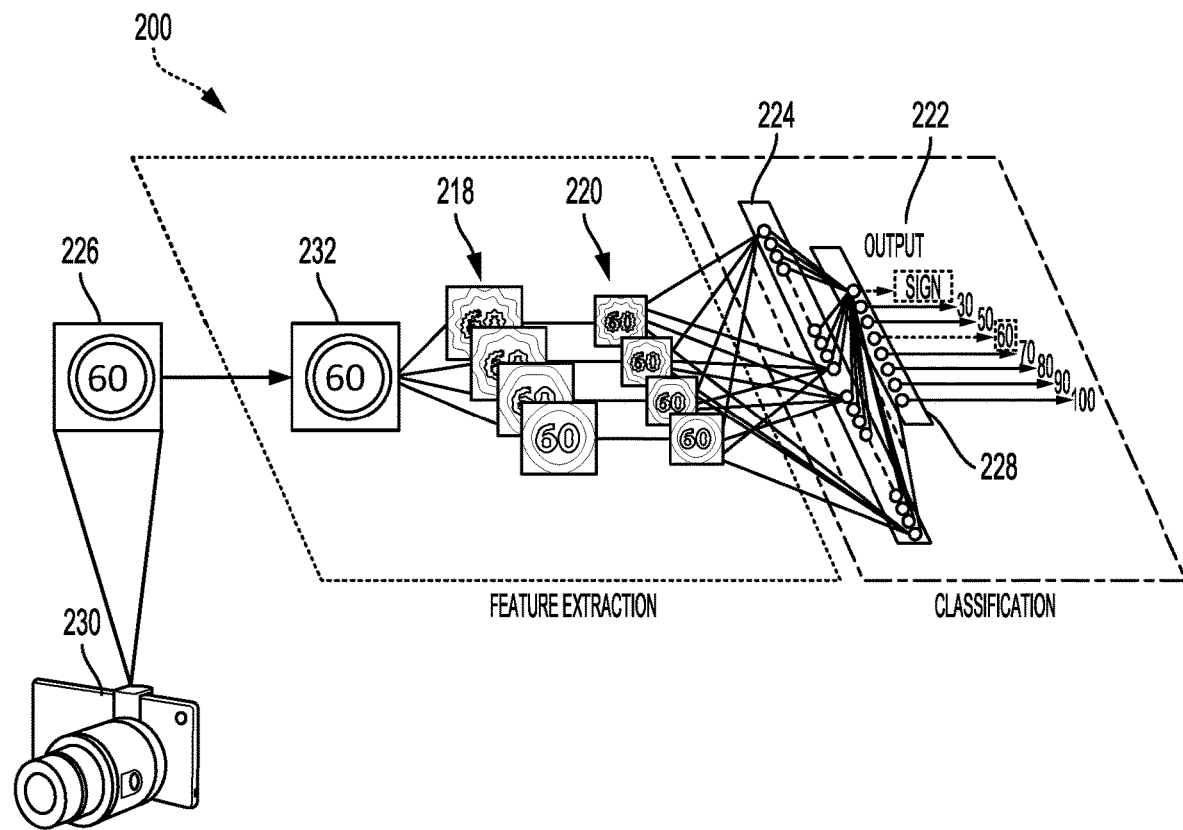
FIG. 2D is a diagram illustrating an exemplary deep convolutional network (DCN), in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
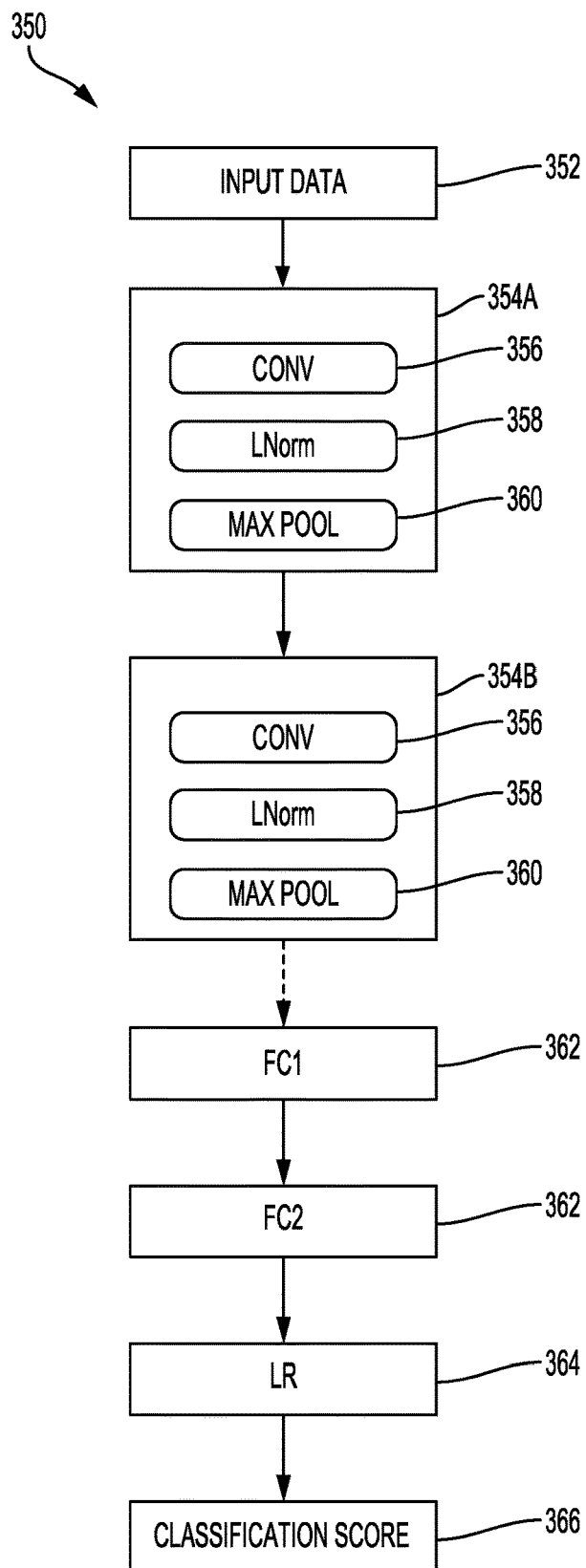
FIG. 3 is a block diagram illustrating an exemplary deep convolutional network (DCN), in accordance with aspects of the present disclosure.

FIG. 3 is a block diagram illustrating a deep convolutional network 350, in accordance with aspects of the present disclosure. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Long-range human activities may have various characteristics, such as a long temporal duration, a complex composition, and/or an arbitrary temporal order. Coffee preparation is an example of a long-range human activity. In some cases, from the time of brewing to the final drinking step, coffee preparation may take ten minutes. Like most long-range activities, coffee preparation is composed of multiple short, building blocks (e.g., actions), such as "take cup" and "pour milk." The temporal order of the building blocks may vary based on the individual that is performing the activity.

Figure 4:
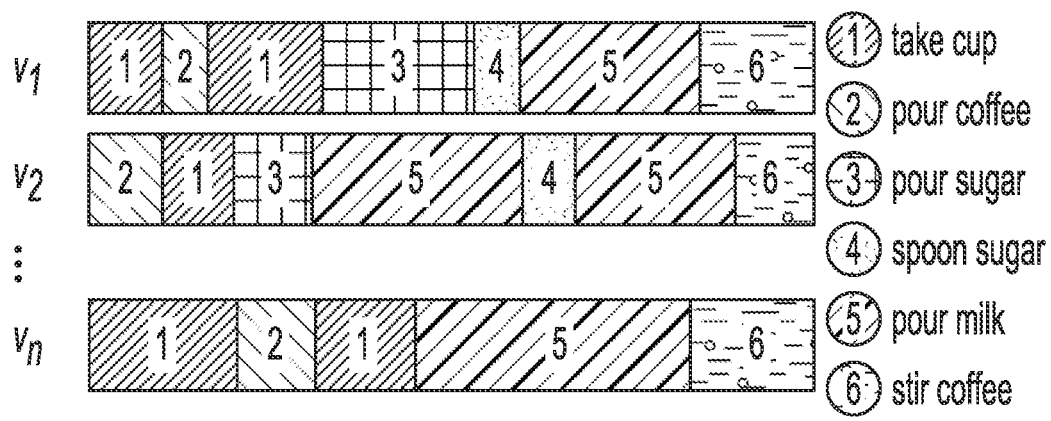
FIG. 4 illustrates multiple example temporal structures for a long-range activity, in accordance with aspects of the present disclosure.

FIG. 4 illustrates multiple example temporal structures 400 for a long-range activity of pouring coffee, in accordance with aspects of the present disclosure. As shown in FIG. 4, coffee preparation may include multiple actions. For clarity, the actions of FIG. 4 have been associated with numerical identifiers. The actions include take cup (1), pour coffee (2), pour sugar (3), spoon sugar (4), pour milk (5), and stir coffee (6). The aforementioned actions are provided as an example only, more or fewer actions may be associated with the task of pouring coffee.

Each temporal structure of video examples ($v_1$, $v_2$, ..., $v_n$) may be obtained from a different input stream. Due to personal preferences, coffee preparation may have many variables. Therefore, the order of actions in each temporal structure may be different. For example, as shown in FIG. 4, in the first temporal structure $v_1$, the "spoon sugar" action follows the "pour sugar" action. In contrast, in the second temporal structure $v_2$, the "pour milk" action follows the "pour sugar" action.

As shown in FIG. 4, long-range activities exhibit a complex temporal structure with a weak temporal order. The temporal structures 400 may be described as partially ordered sets having a macro-level and a micro-level. The macro-level and micro-level information may be used to model the temporal structure of long-range activities. On the macro-level, the long-range activity is subdivided into sets (a set may also be referred to as a segment) of actions (e.g., a unit-action). For example, coffee preparation may include three sets of actions ($v=\{s_1, s_2, s_3\}$), where v is a temporal structure and $s_1$ is an action set. Neighboring actions tend to fall into a small set, irrespective of order.

As an example, for the first temporal structure $v_1$, set one $s_1$ may include "take cup" and "pour coffee." The actions of set one $s_1$ are typically performed at the beginning of the activity. Set two $s_2$ may include "pour sugar," "spoon sugar," and "pour milk." The actions of set two $s_2$ are typically performed in the middle of the activity. Set three $s_3$ may include "stir coffee." The actions of set three $s_3$ are typically performed at the end of the activity.

In the second temporal structure $v_2$, set one $s_1$ may include "pour coffee" and "take cup." Although the order of set one $s_1$ for the second temporal structure $v_2$ is different from the order of set one $s_1$ for the first temporal structure $v_1$, both sets include the same actions that occur at the beginning of the activity. That is, on the micro-level, each set or segment may include the same combination of actions regardless of the video example of the specific activity. Although actions in each set may not have a prevailing order, actions tend to co-accrue in the same set, regardless of the video.

On the macro-level, the sequence of action sets tend to have a greater temporal structure (e.g., $s_1 \rightarrow s_2 \rightarrow s_3$) in comparison to the actions in each action set. That is, across multiple videos of the same activities, the sets tend to follow the same order $s_1$-$s_2$-$s_3$.

As discussed, conventional systems use different solutions for temporal modeling, such as convolutions, self-attention, and vector aggregation. These solutions may accurately identify activities of short-range videos. For long-range videos, some proposed solutions include vector aggregation, long-term features, and long-range convolutions. For various reasons, an accuracy of these solutions may be limited. For example, conventional solutions do not learn long-range temporal abstractions. As another example, the conventional solutions are not invariant to temporal order. Finally, some conventional solutions do not share weights, and as a result, these solutions cannot detect discriminant concepts.

In one configuration, a temporal modeling layer (e.g., PIC) is used to recognize long-range activities. The temporal modeling layer improves the accuracy of long-range activity classification. For simplicity, the temporal modeling layer may be referred to as PIC. In contrast to vector aggregation and self-attention, PIC considers local connectivity, such that long temporal abstractions are learned over a cascade of layers. Additionally, in contrast to conventional convolutions, PIC is invariant to the temporal permutations within a window of local connectivity.

Aspects of the present disclosure are not limited to modeling videos (e.g., red-green-blue (RGB) modality). Other modalities, such as flow, dynamics, and sound may be used.

As discussed, a structure of the long-range activities may be defined as partially ordered sets with two levels of abstractions (e.g., macro-level and micro-level). On the macro-level, the entire video v of long-range activity includes action sets ($v=\{s_1, s_2, \ldots, s_N\}$) that may be structured and ordered, over time. On the micro-level, each set includes correlated actions, with no particular order. Each action in a set may be referred to as a one-action.

The two-level structure of partially ordered sets may be learned using a convolutional approach with a cascade of layers. The bottom layers learn the correlation between the actions within each set. The top layers learn the interactions between the sets. The convolutional operation is invariant to the temporal order of one-actions. To this end, PIC may replace a convolution layer (e.g., convolution layer 356 of FIG. 3).

For simplicity, the present disclosure focuses on temporal modeling. The backbone neural network may focus on spatial modeling. In conventional systems, a kernel is learned for a convolution layer. The learned kernel is convolved with feature windows to generate features of the input. Still, the learned kernel is dependent on the temporal sequence of the feature window.

Figure 5:
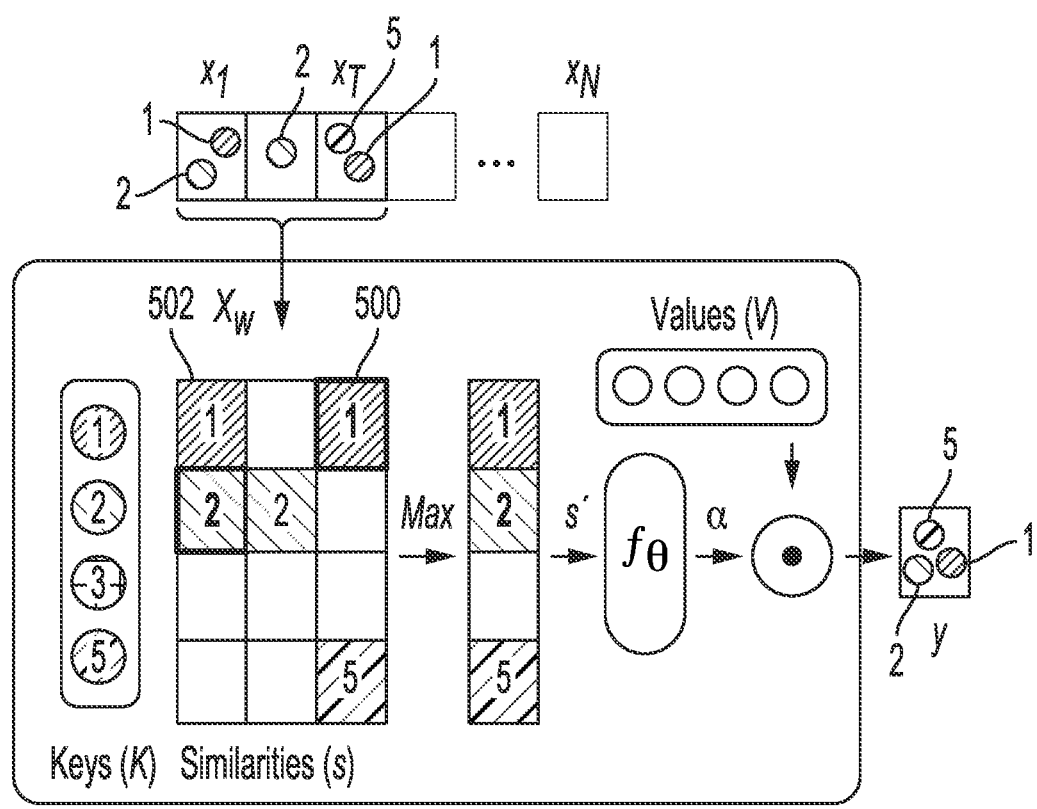
FIG. 5 illustrates an example of a permutation invariant convolution (PIC) operation, in accordance with aspects of the present disclosure.

In contrast, PIC is a permutation invariant convolution. FIG. 5 illustrates an example of a function of a PIC layer 500, according to aspects of the present disclosure. As shown in FIG. 5, the PIC layer 500 receives a feature window $X_w$ as an input. The feature window $X_w$ is a window of T frames ($x_1, x_2, \ldots, x_T$) from a total number of frames in a video 502, where T is greater than or equal to three. Each frame (e.g., $x_1$) may depict one or more actions. The feature window $X_w$ may also be referred to as a local window. For ease of explanation, FIG. 5 is directed to a coffee pouring activity. The actions and numerical identifiers of FIG. 5 correspond to the actions and numerical identifiers of FIG. 4.

As shown in FIG. 5, a first frame $x_1$ has a likelihood of depicting the following actions: take cup (1) and pour coffee (2). The PIC layer 500 uses a pair of linked kernels, referred to as concept keys K (shown as Keys (K)) and values V (K∈$\mathbb{R}^{M \times C}$, V∈$\mathbb{R}^{M \times C}$), where M is the number of kernels, and C is the kernel dimension. The concept keys K detect latent visual concepts in the video 502. A similarity matrix s∈$\mathbb{R}^{M \times T}$ is generated by using a dot product to measure the similarity of the concept keys K and features of each frame of the feature window $X_w$. That is, the similarity matrix s encodes the likelihood of latent concepts in the current feature window $X_w$. In one configuration, at each layer of a cascade of layers, each concept key in K detects one action of a set of actions.

As shown in FIG. 5, the similarity matrix s (shown as Similarities (s)) encodes the first frame $x_1$ and last frame $x_T$ as having a likelihood of depicting the take cup (1) activity. In FIG. 5, a first element 504 of the similarity matrix s has a bold activity identifier (1) to indicate the first element 504 has a higher likelihood of depicting the take cup (1) activity in comparison to a second element 506. The bolded text for an activity identifier of an element in the similarity matrix s indicates a greater likelihood than non-bolded text for an activity identifier of an element. The likelihood may be determined based on the similarity measurement performed with the concept keys K.

The similarities in similarity matrix s are max pooled to generate a max pooled similarity vector s'∈$\mathbb{R}^{M \times 1}$. The max pooled similarity vector s' summarizes the frames having the maximum likelihood of M concepts taking place in the feature window $X_w$. That is, the max pooled similarity vector s' is populated with the frame having the highest (e.g., maximum) likelihood of depicting an action. For example, in FIG. 5, the first element 504 populates the first element of the similarity vector s' because it has a greater likelihood of depicting the action (1) take cup than the second element 506 and a third element 508.

After estimating the pooled similarity vector s', the values kernel V is applied to represent the detected features. In some aspects, the values kernel V is applied to represent only the detected features. The concept keys kernel K and values kernel V de-couple concept detection (via the concept keys kernel K) from concept representation (via the values kernel V). Decoupling the concept keys kernel K from the values kernel V beneficially provides for more concept keys K∈$\mathbb{R}^{M \times C}$ for detection and less value V∈$\mathbb{R}^{M' \times C}$ for representation, where M'<<M.

A dense layer $f_\theta(\cdot)$ models a correlation between the similarities of similarity vector s'. The correlation is embedded from a higher dimension $\mathbb{R}^{M \times 1}$ to a lower dimension $\mathbb{R}^{M' \times 1}$. An activation function a (e.g., sigmoid or rectified linear unit (ReLU)) may be applied to the dense layer $f_\theta(\cdot)$ to generate activated similarities $\alpha \in \mathbb{R}^{M \times 1}$ (may also be referred to as attention vector α). Finally, a dot product of the activated similarities α and the value kernels V is computed to provide the representation y∈$\mathbb{R}^{1 \times C}$. represent the transpose of the vector/matrix.

Accordingly, in contrast to the temporal convolution of conventional action recognition systems (see Equation 1), the permutation invariant convolution (PIC) may be formulated as:

$$s = K \otimes X_w^T \quad (2)$$

$$s' = \max_{row}(s) \quad (3)$$

$$\alpha = \sigma[f_\theta(s')] \quad (4)$$

$$y = \alpha^T \odot V, \quad (5)$$

where ⊙ represents the Hadamard product and ⊗ represents the tensor product.

The PIC layer 500 may be added as a layer to a backbone two-dimensional or three-dimensional convolutional neural network (CNN) (e.g., deep convolutional network 350 of FIG. 3). In one configuration, the PIC layer 500 uses a residual bottleneck to reduce computations. For example, the dimension C of the feature window $X_w \in \mathbb{R}^{T \times C}$ may be reduced by a reduction value. As an example, the reduction value may be four, such that the reduced dimension C'=C/4. The dimension may be reduced before the convolution by a first dense layer $g_\phi(\cdot)$. To enable a residual connection, the input dimension C may be recovered by a second dense layer $h_\psi(\cdot)$.

The spatial dimensions may be modeled by the backbone CNN. The kernels K, V learned by the PIC layer 500 are shared parameters (e.g., weights), and are not inferred from or depend on the feature window Shared kernels may improve the neural network's ability to detect discriminant visual concepts across the entire long-range activity without being conditioned on the feature window $X_w$. This design may provide robustness to noisy evidence in the feature window $X_w$.

In addition, the PIC layer 500 respects temporal locality. In other words, the PIC layer 500 convolves the features of local windows $X_w$, in contrast to global windows used in self-attention. Because the PIC layer 500 respects temporal locality, the PIC layer 500 may learn multiple levels of abstractions with cascaded layers.

Figure 6:
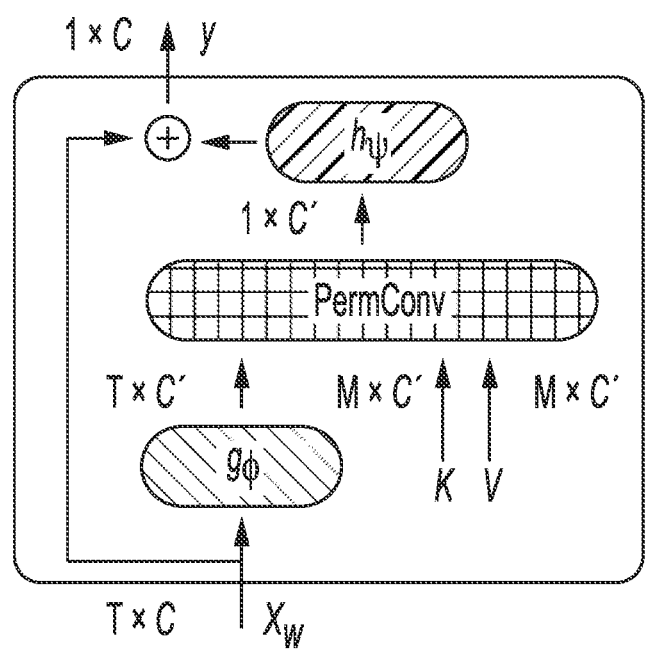
FIG. 6 illustrates an example of a permutation invariant convolution (PIC) layer, in accordance with aspects of the present disclosure.

FIG. 6 illustrates another example of a permutation invariant convolution (PIC) layer 600, in accordance with aspects of the present disclosure. As shown in FIG. 6, a feature window $X_w$ having a dimension of T×C is received at a first dense layer $g_{99}$ (•). The feature window $X_w$ with a reduced dimension C' is received at the PIC layer 600. The PIC layer 600 also receives the concept keys kernel K and values kernel V having a dimension of M×C'. The PIC layer 600 outputs the representation y of dimension 1×C' to the second dense layer $h_\psi$(•). The second dense layer $h_\psi$(•) restores the input dimension C.

Figure 7:
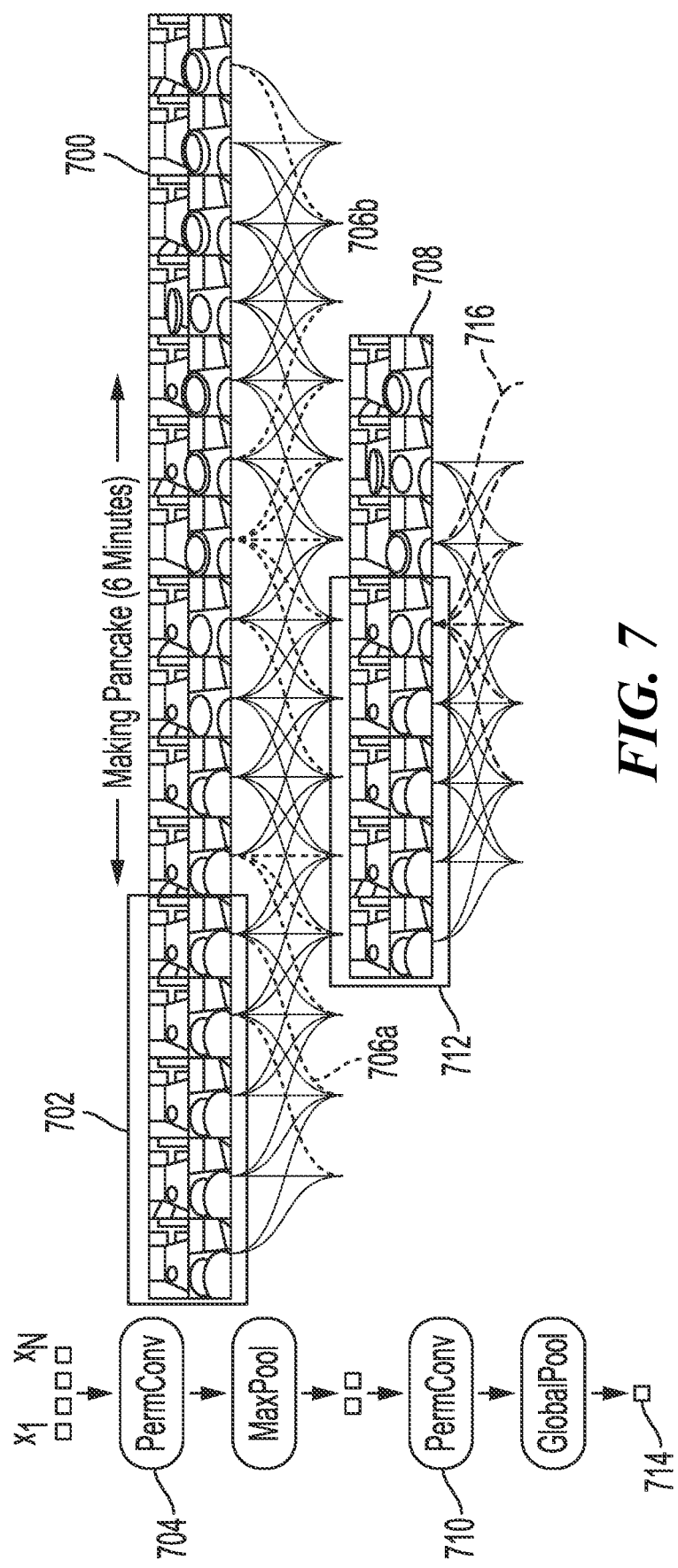
FIG. 7 illustrates an example of identifying a long-range activity, in accordance with aspects of the present disclosure.

FIG. 7 illustrates an example of identifying long-range activity, in a video 700, according to aspects of the present disclosure. As shown in FIG. 7, the video 700 of making pancakes is input to a neural network. The video 700 is segmented into feature windows 702 of size N. That is, each feature window 702 includes N frames ($x_1$ to $x_N$). In FIG. 7, N is five. Of course, N may be greater than or less than five. In one configuration, N is an odd integer.

Each feature window 702 is processed by a first permutation invariant convolution (PIC) layer 704. In the example of FIG. 7, the first PIC layer 704 identifies one feature from a set of features. For example, the first PIC layer 704 may be specified to identify frames with a greatest likelihood of depicting a pouring action.

As discussed, from a similarity matrix, the max pooling function identifies a frame from the feature window (e.g., 702) with the highest likelihood of depicting the specific action. In FIG. 7, solid lines 706a correspond to frames from each feature window 702 with the highest likelihood of depicting the pouring action. Dashed lines 706b correspond to frames from each feature window 702 with a lesser likelihood of depicting the pouring action.

A max pooling function generates a set of frames 708 from the set of frames identified as having the highest likelihood of depicting the pouring action. For simplicity, FIG. 7 illustrates frames (e.g., 706a) with the highest likelihood of depicting the pouring action. Aspects of the present disclosure are not limited to identifying one concept. Multiple concepts may be identified from the video 700. Features of frames may be pooled, with for example, a local pooling method. In local pooling, adjacent features are max-pooled. For example, every two adjacent frames are max-pooled. In this example, regardless of the activation values, the second layer has eight features.

A second PIC layer 710 is specified to identify fine-grained concepts. For example, the pouring activity is irrespective of activities such as "making coffee," "making tea," and "making pancakes." As such, the second PIC layer 710 identifies an activity that corresponds to the pouring action.

The set of frames 708 is segmented into feature windows 712 of size N. The second PIC layer 710 identifies frames with a highest likelihood of depicting an action from a set of actions. The frames with the highest likelihood are identified and pooled at a global pooling function to generate a final output 714 that may be a global representation of the activities observed in the video stream. For example, in FIG. 7, the second PIC layer 710 may identify frames with the highest likelihood of depicting a cooking activity. In FIG. 7, solid lines 716 correspond to frames from each feature window 712 with the highest likelihood of depicting the pouring action. The final output 714 may then be classified as a cooking pancake action. In one configuration, two hidden layer multilayer perceptrons may provide a classification, for example.

As discussed, in accordance with aspects of the neural network models may learn an order-less temporal representation of atomic actions in the video (e.g., 700). As such, the accuracy of the model may be uncompromised if the input segments of the video (e.g., 700) are reordered (e.g., randomly shuffled). The model may categorize action videos with a relatively long timespan (e.g., greater than or equal to a few minutes). Finally, the model is invariant to the horizontal flipping.

Figure 8:
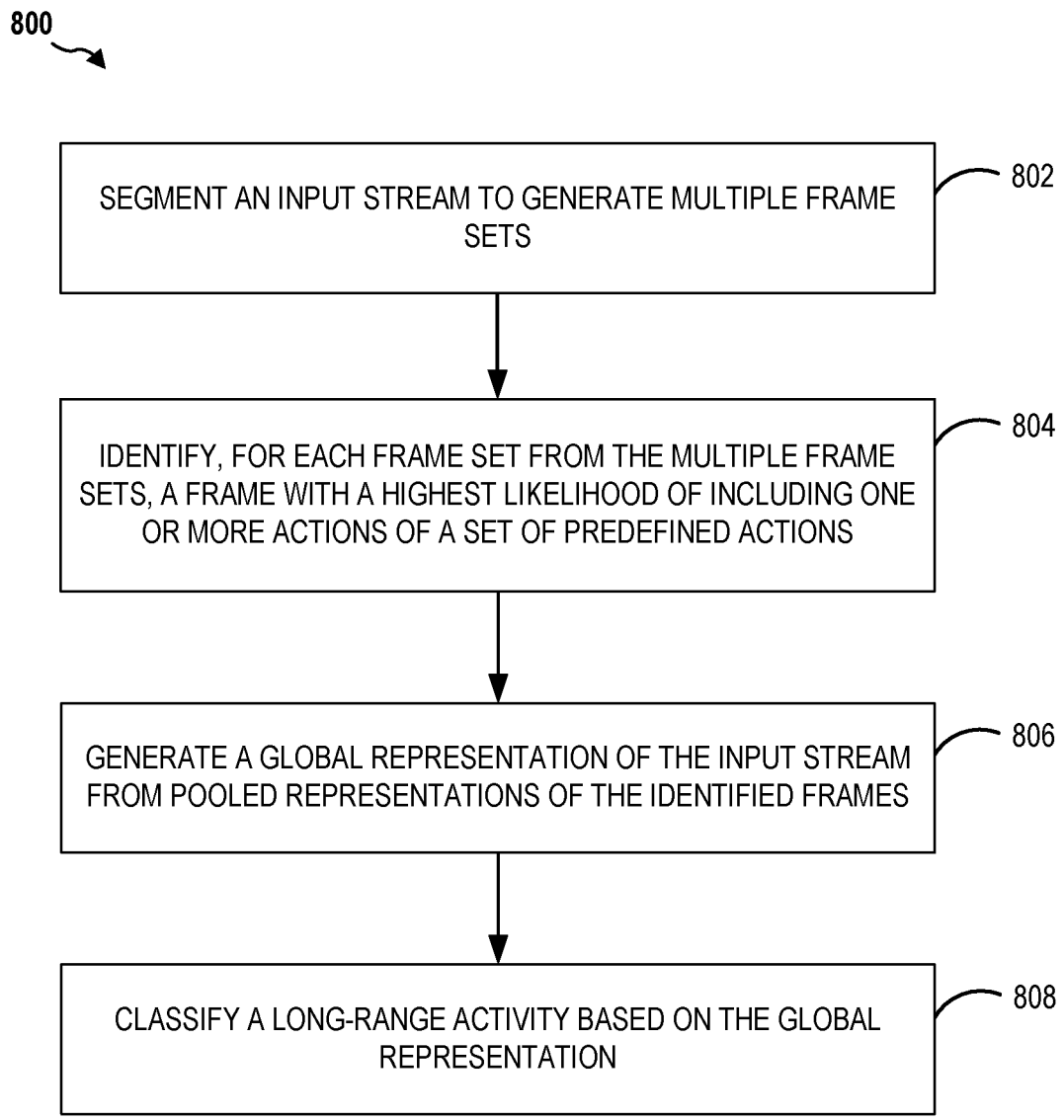
FIG. 8 illustrates a flow diagram for a method, in accordance with aspects of the present disclosure.

FIG. 8 illustrates a flow diagram for a method 800, according to aspects of the present disclosure. As shown in FIG. 8, at block 802, a neural network segments an input stream to generate multiple frame sets. The input stream may be a video of a long-range activity. At block 804, the neural network identifies, for each frame set from the multiple frame sets, a frame with a highest likelihood of including one or more actions of a set of predefined actions.

The frame may be identified by generating a similarity matrix from a dot product of features of the frame set and a first kernel. Similarities in the similarity matrix may be max-pooled to identify the frame with the highest likelihood. At block 806, the neural network generates a global representation of the input stream from pooled representations of the identified frames. The representations of the identified frames may be generated by generating an attention vector from the similarity matrix and generating a representation of the identified frames based on a dot product of the attention vector and a second kernel. In one configuration, the first kernel and the second kernel are linked.

The global representation may be generated from a dot product of the representations of the identified frames. At block 808, the neural network classifies a long-range activity from the global representation. A permutation invariant convolutional layer of the neural network may identify a frame of the segment of frames with a highest likelihood and generate the representation. The neural network may include multiple cascading permutation invariant convolutional layers.

In some aspects, the method 800 may be performed by the SOC 100 (FIG. 1). That is, each of the elements of the method 800 may, for example, but without limitation, be performed by the SOC 100 or one or more processors (e.g., CPU 102) and/or other included components.

Implementation examples are described in the following numbered clauses:

1. A method, comprising:
   segmenting an input stream to generate a plurality of frame sets;
   identifying, for each frame set from the plurality of frame sets, a frame with a highest likelihood of including one or more of a set of predefined actions;
   generating a global representation of the input stream from pooled representations of the identified frames; and
   classifying a long-range activity based on the global representation.

2. The method of clause 1, in which identifying the frame comprises generating a similarity matrix from a dot product of features of the frame set and a first kernel.

3. The method of clause 2, further comprising max-pooling similarities in the similarity matrix to identify the frame with the highest likelihood.

4. The method of clause 3, further comprising:
   generating an attention vector from the similarity matrix; and
   generating the global representation of the identified frame based on a dot product of the attention vector and a second kernel.
5. The method of clause 4, in which the first kernel and the second kernel are linked.
6. The method of clause 1, in which the global representation is based on a dot product of the pooled representations of the identified frames.
7. The method of clause 1, in which the identifying and generating are performed at a permutation invariant convolutional layer of a neural network.
8. The method of any of clauses 1-7, in which the neural network comprises a plurality of cascading permutation invariant convolutional layers.
9. An apparatus, comprising:
   a memory; and
   at least one processor coupled to the memory, the at least one processor configured:
      to segment an input stream to generate a plurality of frame sets;
      to identify, for each frame set from the plurality of frame sets, a frame with a highest likelihood of including one or more actions of a set of predefined actions;
         to generate a global representation of the input stream from pooled representations of the identified frames; and
         to classify a long-range activity based on the global representation.
10. The apparatus of clause 9, in which the at least one processor is configured to identify the frame by generating a similarity matrix from a dot product of features of the frame set and a first kernel.
11. The apparatus of clause 10, in which the at least one processor is further configured to max-pool similarities in the similarity matrix to identify the frame with the highest likelihood.
12. The apparatus of clause 11, in which the at least one processor is further configured to generate the global representation by: generating an attention vector from the similarity matrix; and generating the global representation of the identified frame based on a dot product of the attention vector and a second kernel.
13. The apparatus of clause 12, in which the first kernel and the second kernel are linked.
14. The apparatus of clause 9, in which the at least on processor is further configured to generate the global representation based on a dot product of the pooled representations of the identified frames.
15. The apparatus of clause 9, in which the at least one processor is further configured to identify and generate at a permutation invariant convolutional layer of a neural network.
16. The apparatus of any of clauses 9-15, in which the neural network comprises a plurality of cascading permutation invariant convolutional layers.
17. An apparatus, comprising:
   means for segmenting an input stream to generate a plurality of frame sets;
   means for identifying, for each frame set from the plurality of frame sets, a frame with a highest likelihood of including one or more actions of a set of predefined actions;
   means for generating a global representation of the input stream from pooled representations of the identified frames; and
   means for classifying a long-range activity based on the global representation.
18. The apparatus of clause 17, further comprising means for generating a similarity matrix from a dot product of features of the frame set and a first kernel.
19. The apparatus of clause 18, further comprising means for max-pooling similarities in the similarity matrix to identify the frame with the highest likelihood.
20. The apparatus of clause 19, further comprising:
   means for generating an attention vector from the similarity matrix; and
   means for generating the global representation of the identified frame based on a dot product of the attention vector and a second kernel.
21. The apparatus of clause 20, in which the first kernel and the second kernel are linked.
22. The apparatus of any of clauses 17-21, in which the global representation is based on a dot product of the pooled representations of the identified frames.
23. A non-transitory computer-readable medium having program code recorded, the program code executed by a processor and comprising:
   program code to segment an input stream to generate a plurality of frame sets;
   program code to identify, for each frame set from the plurality of frame sets, a frame with a highest likelihood of including one or more actions of a set of predefined actions;
   program code to generate a global representation of the input stream from pooled representations of the identified frames; and
   program code to classify a long-range activity based on the global representation.
24. The non-transitory computer-readable medium of clause 23, further comprising program code to identify the frame by generating a similarity matrix from a dot product of features of the frame set and a first kernel.
25. The non-transitory computer-readable medium of clause 24, further comprising program code to max-pool similarities in the similarity matrix to identify the frame with the highest likelihood.
26. The non-transitory computer-readable medium of clause 25, further comprising program code:
   program code to generate an attention vector from the similarity matrix; and
   program code to generating the global representation of the identified frame based on a dot product of the attention vector and a second kernel.
27. The non-transitory computer-readable medium of clause 26, in which the first kernel and the second kernel are linked.
28. The non-transitory computer-readable medium of clause 23, further comprising program code to generate the global representation based on a dot product of the pooled representations of the identified frames.
29. The non-transitory computer-readable medium of clause 23, further comprising program code to identify and generate at a permutation invariant convolutional layer of a neural network.
30. The non-transitory computer-readable medium any of clauses 23-29, in which the neural network comprises a plurality of cascading permutation invariant convolutional layers.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method, comprising:
segmenting an input stream to generate a plurality of frame sets, each frame set including a plurality of frames;
identifying, by a permutation invariant convolutional layer of a neural network, for each frame set from the plurality of frame sets, a frame with a highest likelihood of including one or more actions of a set of predefined actions;
generating a global representation of the input stream from pooled representations of the identified frames; and
classifying a long-range activity based on the global representation.

2. The method of claim 1, in which identifying the frame comprises generating a similarity matrix from a dot product of features of the frame set and a first kernel.

3. The method of claim 2, further comprising max-pooling similarities in the similarity matrix to identify the frame with the highest likelihood.

4. The method of claim 3, further comprising:
generating an attention vector from the similarity matrix; and
generating the global representation based on a dot product of the attention vector and a second kernel.

5. The method of claim 4, in which the first kernel and the second kernel are linked.

6. The method of claim 1, in which the global representation is based on a dot product of the pooled representations of the identified frames.

7. The method of claim 1, in which generating the global representation is performed by the permutation invariant convolutional layer of the neural network.

8. The method of claim 7, in which the neural network comprises a plurality of cascading permutation invariant convolutional layers.

9. An apparatus, comprising:
a memory; and
at least one processor coupled to the memory, the at least one processor configured to:
segment an input stream to generate a plurality of frame sets, each frame set including a plurality of frames;

identify, by a permutation invariant convolutional layer of a neural network, for each frame set from the plurality of frame sets, a frame with a highest likelihood of including a one or more actions of a set of predefined actions;
generate a global representation of the input stream from pooled representations of the identified frames; and
classify a long-range activity based on the global representation.

10. The apparatus of claim 9, in which the at least one processor is configured to identify the frame by generating a similarity matrix from a dot product of features of the frame set and a first kernel.

11. The apparatus of claim 10, in which the at least one processor is further configured to max-pool similarities in the similarity matrix to identify the frame with the highest likelihood.

12. The apparatus of claim 11, in which the at least one processor is further configured to:
generating an attention vector from the similarity matrix; and
generating the global representation based on a dot product of the attention vector and a second kernel.

13. The apparatus of claim 12, in which the first kernel and the second kernel are linked.

14. The apparatus of claim 9, in which the at least on processor is further configured to generate the global representation based on a dot product of the pooled representations of the identified frames.

15. The apparatus of claim 9, in which the at least one processor is further configured to generate the global representation by the permutation invariant convolutional layer of the neural network.

16. The apparatus of claim 15, in which the neural network comprises a plurality of cascading permutation invariant convolutional layers.

17. An apparatus, comprising:
means for segmenting an input stream to generate a plurality of frame sets, each frame set including a plurality of frames;
means for identifying, by a permutation invariant convolutional layer of a neural network, for each frame set from the plurality of frame sets, a frame with a highest likelihood of including one or more actions of a set of predefined actions;
means for generating a global representation of the input stream from pooled representations of the identified frames; and
means for classifying a long-range activity based on the global representation.

18. The apparatus of claim 17, further comprising means for generating a similarity matrix from a dot product of features of the frame set and a first kernel.

19. The apparatus of claim 18, further comprising means for max-pooling similarities in the similarity matrix to identify the frame with the highest likelihood.

20. The apparatus of claim 19, further comprising:
means for generating an attention vector from the similarity matrix; and
means for generating the global representation based on a dot product of the attention vector and a second kernel.

21. The apparatus of claim 20, in which the first kernel and the second kernel are linked.

22. The apparatus of claim 17, in which the global representation is based on a dot product of the pooled representations of the identified frames.

23. A non-transitory computer-readable medium having program code recorded, the program code executed by a processor and comprising:
program code to segment an input stream to generate a plurality of frame sets, each frame set including a plurality of frames;
program code to identify, by a permutation invariant convolutional layer of a neural network, for each frame set from the plurality of frame sets, a frame with a highest likelihood of including one or more actions of a set of predefined actions;
program code to generate a global representation of the input stream from pooled representations of the identified frames; and
program code to classify a long-range activity based on the global representation.

24. The non-transitory computer-readable medium of claim 23, further comprising program code to identify the frame by generating a similarity matrix from a dot product of features of the frame set and a first kernel.

25. The non-transitory computer-readable medium of claim 24, further comprising program code to max-pool similarities in the similarity matrix to identify the frame with the highest likelihood.

26. The non-transitory computer-readable medium of claim 25, further comprising program code:
program code to generate an attention vector from the similarity matrix; and
program code to generate the global representation based on a dot product of the attention vector and a second kernel.

27. The non-transitory computer-readable medium of claim 26, in which the first kernel and the second kernel are linked.

28. The non-transitory computer-readable medium of claim 23, further comprising program code to generate the global representation based on a dot product of the pooled representations of the identified frames.

29. The non-transitory computer-readable medium of claim 23, further comprising program code to generate the global representation at the permutation invariant convolutional layer of the neural network.

30. The non-transitory computer-readable medium of claim 29, in which the neural network comprises a plurality of cascading permutation invariant convolutional layers.

* * * * *

UNITED STATES PATENT AND TRADEMARK OFFICE
CERTIFICATE OF CORRECTION

PATENT NO. : 12,333,811 B2
APPLICATION NO. : 17/769246
DATED : June 17, 2025
INVENTOR(S) : Noureldien Mahmoud Elsayed Hussein, Efstratios Gavves and Arnold W. M. Smeulders It is certified that error appears in the above-identified patent and that said Letters Patent is hereby corrected as shown below:

On the Title Page

Item (73) Assignee:
Please replace "QUALCOMM Incorporated, San Diego, CA (US)" with --QUALCOMM Technologies, Inc., San Diego, CA (US)--

Signed and Sealed this
Twenty-third Day of September, 2025

John A. Squires
*Director of the United States Patent and Trademark Office*